Figure 1:
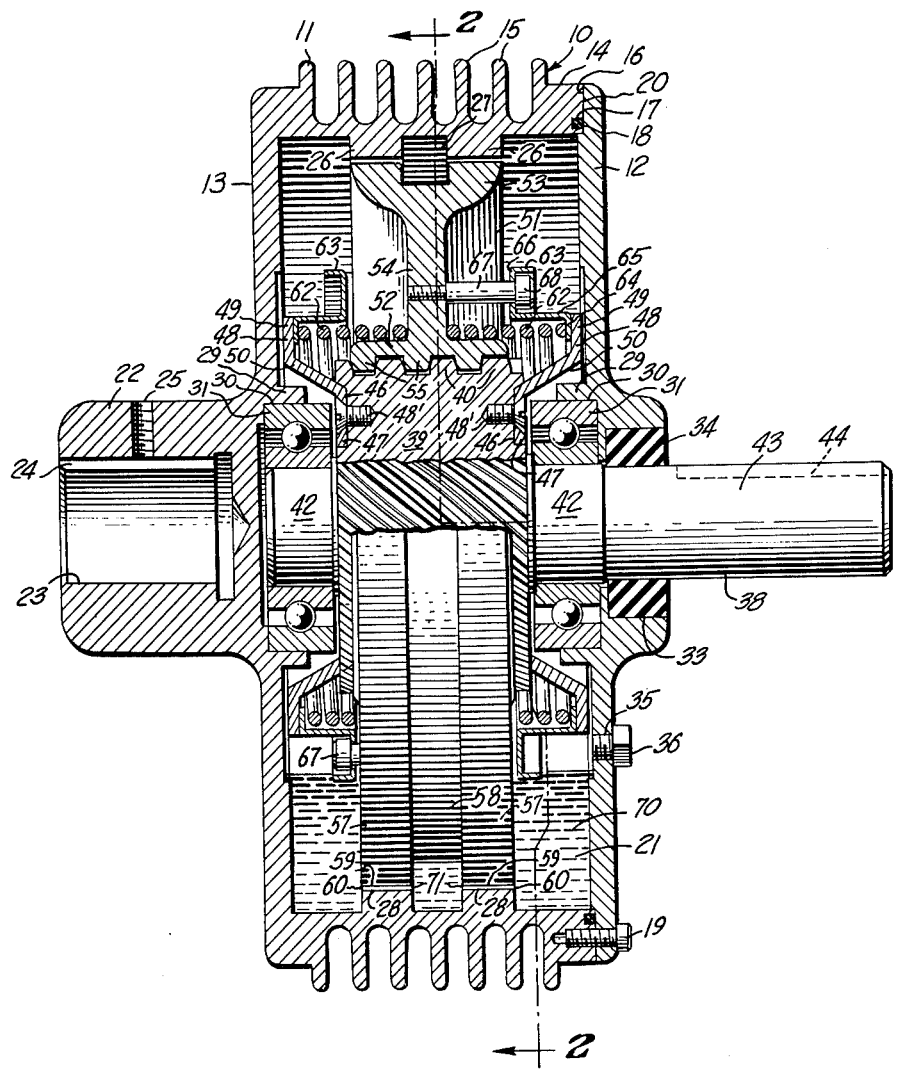

Dec. 4, 1962 R. E. BLAU 3,066,780
POWER TRANSMISSION COUPLING
Filed Aug. 26, 1959 3 Sheets-Sheet 1

Dec. 4, 1962 R. E. BLAU 3,066,780
POWER TRANSMISSION COUPLING
Filed Aug. 26, 1959 3 Sheets-Sheet 2

Dec. 4, 1962 R. E. BLAU 3,066,780
POWER TRANSMISSION COUPLING
Filed Aug. 26, 1959 3 Sheets-Sheet 3

United States Patent Office 3,066,780
Patented Dec. 4, 1962

3,066,780
POWER TRANSMISSION COUPLING
Robert E. Blau, Winnetka, Ill., assignor to Link-Belt
Company, a corporation of Illinois
Filed Aug. 26, 1959, Ser. No. 836,205
18 Claims. (Cl. 192—58)

This invention relates to power transmission devices, and deals more particularly with a new and improved torque-limiting coupling for transmitting power between two rotatable members.

The primary object of this invention is to provide a coupling for transmitting mechanical power between two rotatable members and for limiting the transmitted torque to a given maximum value.

Another object of this invention is to provide a coupling of the above character capable of transmitting torque between two rotatable members regardless of the direction in which the driving member is rotated.

A further object of this invention is to provide a coupling for transmitting power between a driving member, such as a motor shaft, and a driven load member, such as a machine shaft, with the coupling providing a "soft start" for the machine by permitting relatively high slippage during starting conditions to allow the motor to start free of load and to quickly approach its optimum speed and operating torque, thereby avoiding excessive starting current in the motor and producing a smooth, gradual acceleration of high inertia loads, the coupling further having a relatively low slip at rated load, giving it a high mechanical efficiency under normal operating conditions, and having automatic means for preventing the transmission of overloads, shocks or impacts from the machine to the motor.

A still further object of this invention is to provide a torque-limiting coupling of simple construction in which the maximum transmitted torque may be preset to any one of a number of different values by the use of readily interchangeable parts.

Another object of this invention is to provide a power transmission coupling employing a viscous fluid shear connection and means, sensitive to the transmitted torque and operable in the case of an overload, to vary the effective shear area of the viscous fluid shear connection to limit the transmitted torque to a given preselected maximum value.

A more specific object of this invention is to provide a coupling in which torque is transmitted between two concentric cylindrical surfaces by shear or drag forces that are developed in a viscous fluid film located in an annular gap between the two cylindrical surfaces, and which includes a mechanical feed-back system that senses the transmitted torque and functions, when the transmitted torque reaches a predetermined value, to change the shear area between the two cylindrical surfaces in such a manner as to prevent the transmission of more than a given maximum amount of torque.

Other objects and advantages of the invention will be apparent during the course of the following description.

Figure 2:
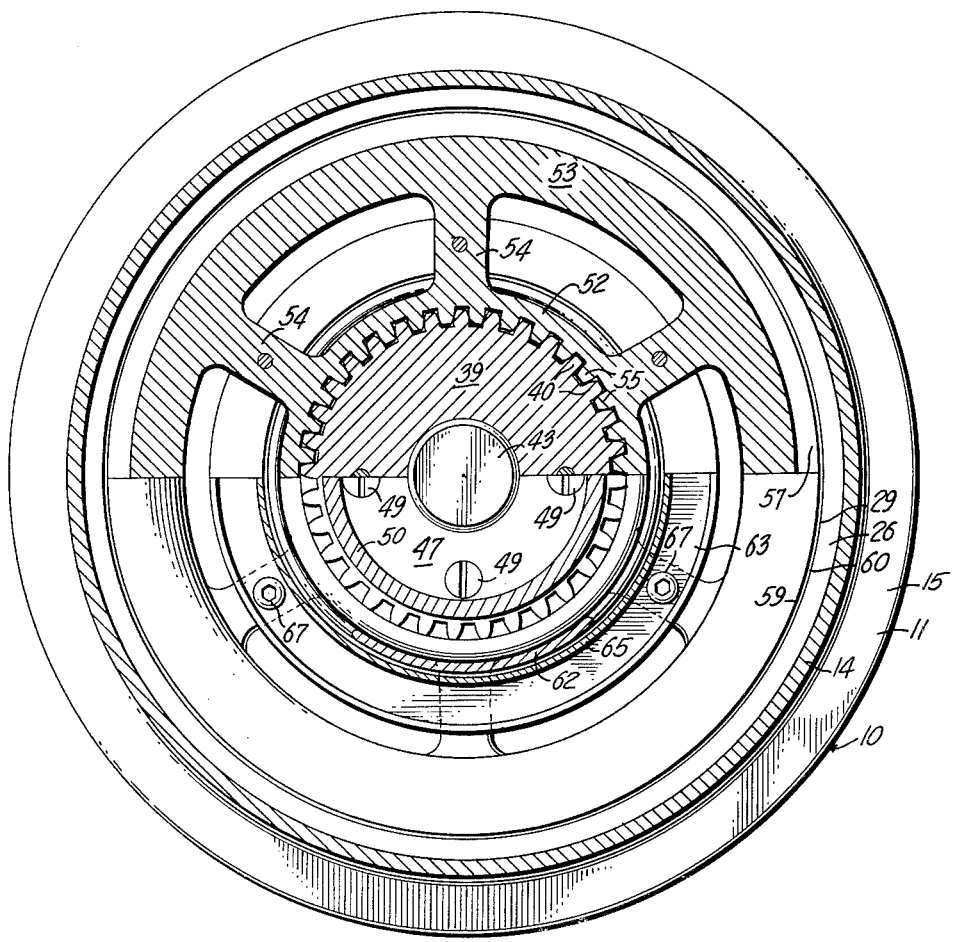
Figure 3:
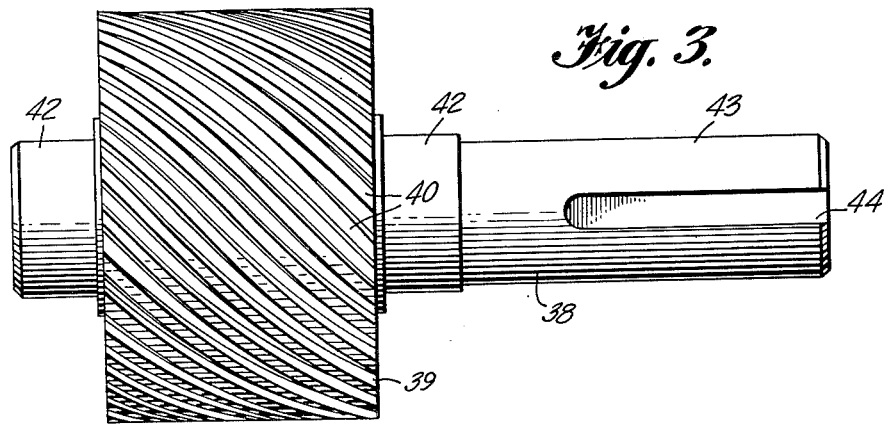
Figure 4:
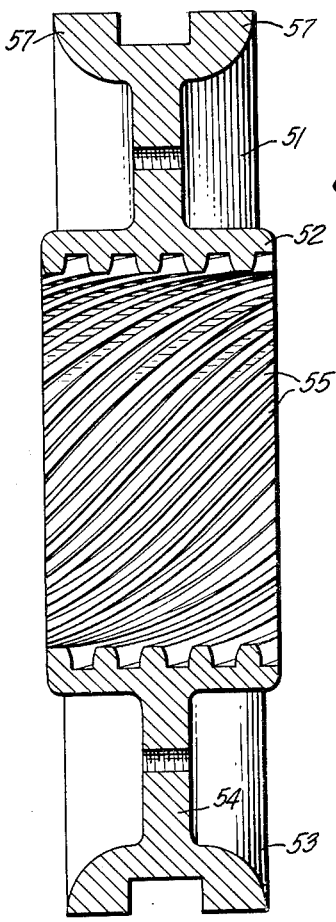

In the accompanying drawings forming a part of this specification and in which like numerals are employed to designate like parts throughout the same, FIGURE 1 is a partly elevational and partly sectional view of a coupling embodying the present invention, FIGURE 2 is a transverse sectional view taken on line 2—2 of FIG. 1, FIGURE 3 is an elevational view of the driven shaft and its cam element employed as a part of the coupling of FIG. 1, and FIGURE 4 is a sectional view of the rotor and its cam element employed as a part of the coupling of FIG. 1.

In the drawings, wherein for the purpose of illustration is shown the preferred embodiment of this invention, and first particularly referring to FIG. 1, the coupling includes a housing 10 comprising a main body 11 and a removable end cap 12. The main body 11 includes a radial end wall 13 and an axially extending annular peripheral wall 14 having on its exterior surface a plurality of axially spaced, circumferential cooling fins 15 which aid in the dissipation of heat generated during operation of the coupling. As viewed in FIG. 1, the left-hand end of the annular peripheral wall 14 is integral with the outer margin of the end wall 13, while its right-hand end is machined to provide a flat radial surface 16 and an annular groove 17 in said surface for receiving a sealing ring 18. The end cap 12 is secured to the annular wall 14 by a suitable number of bolts 19 and is provided around its outer margin with a flat machined surface 20 which seats against the surface 16 and forms a seal with the ring 18. Thus, the end wall 13, the annular peripheral wall 14 and the end cap 12 together form a fluid-tight chamber 21 within which the remaining parts of the coupling are positioned.

In order that the housing 10 may be connected to a drive shaft, not shown, the end wall 13 is provided at its center with an outwardly extending hub portion 22 having a bore 23 for receiving the shaft and a keyway 24 for providing a key connection between the shaft and the housing. The hub portion 22 may also be drilled and tapped as at 25 to receive a set screw, not shown.

The inner surface of the annular peripheral wall 14 is formed with two continuous, circumferentially extending internal ribs 26 which are spaced axially inwardly from the end wall 13 and from the end cap 12 and which are separated from each other by a continuous groove 27. The ribs 26 and groove 27, as shown in FIG. 1, are each of substantially the same axial width. The radially inner portions of the ribs 26 are machined to provide each with a cylindrical, viscous fluid shear driving surface 28 that is coaxial with the hub bore 23.

In order that other parts of the coupling may be journaled in the housing 10, the end cap 12 and the end wall 13 are each provided along their inside surfaces with an inwardly extending, centrally located enlargement 29 having a bore 30 into which is pressed-fitted the outer race of a ball bearing 31. Each of the bores 30 is so located that both of the bearings 31 are axially aligned with the cylindrical driving surfaces 28 and the hub bore 23.

The end cap 12 is provided with a central opening 33 for receiving a sealing member 34, of any suitable construction, and with a filling opening 35, normally closed by a threaded plug 36, for supplying torque transmitting fluid to the chamber 21.

Journaled in the housing 10, by means of the bearings 31, is the driven shaft 38 which, as shown in FIG. 3, includes a gearlike cam element or driving member 39 having a series of external, helical cam teeth 40 formed on its outer circumferential surface. The shaft 38 includes a slightly enlarged portion 42 on either side of the cam element 39 and a portion 43 extending axially outwardly from one of the enlargements 42 and provided with a keyway 44. As seen best in FIG. 1, the enlarged shaft portions 42 have the inner races of the bearings 31 press-fitted thereon so that the cam element 39 is rotatably supported, with respect to the housing 10, in the middle of the chamber 21. The shaft portion 43 extends outwardly through the opening 33 in the housing 10 and circumferentially engages the seal 34 to prevent the escape of torque transmitting fluid around the shaft portion.

As will also be noted from FIG. 1, each side wall of the cam element 39 includes an annular recess 46 in which is located the inner radial flange 47 of a thrust plate 48 fastened to the hub by a suitable number of screws 48'. Each of the thrust plates 48 is annular in shape and is reversely bent to provide, in addition to the inner radial flange 47, an outer radial flange 49 and an intermediate web 50 which is integral with and is arranged at an obtuse angle to each of the flanges 47 and 49.

For transmitting torque between the housing 10 and the driven shaft 38, there is mounted on the cam element 39 a rotor 51 which, as seen in FIGS. 1 and 4, includes an inner annular cam element 52, an outer annular rim 53 and a plurality of angularly spaced interconnecting spokes 54. The inner annular cam element 52 is provided, on its inner surface, with a series of internal, helical cam teeth 55 which mesh with the external cam teeth 40 on the outer surface of the cam element 39.

The outer annular rim 53 of the rotor is formed to provide two continuous, circumferentially extending external ribs 57, each of which when the coupling is at rest is radially aligned with a respective one of the housing ribs 26, and an annular groove 58 between the ribs 57 which when the coupling is at rest is radially aligned with the housing groove 27. Further, the outer portions of the ribs 57 are machined to provide each with a cylindrical surface 59 which overlaps the cylindrical surface 28 of the corresponding housing rib 26 and which is closely radially spaced thereto to define a thin annular gap 60 between each pair of opposed cylindrical surfaces 28 and 59.

Considering the mounting of the rotor 51, it will be evident that, due to the meshing engagement between the external helical cam teeth 40 and the internal helical cam teeth 55, the rotor 51 is capable of moving both axially and angularly relative to the cam element 39. In accordance with the invention, however, biasing means are employed to hold the rotor in its at rest position relative to the cam element 39, wherein each of the cylindrical surfaces 59 completely overlaps its corresponding cylindrical surface 28, and to resiliently resist movement of the rotor away from such at rest position. This biasing means includes a helical compression spring 62 located on each side of the rotor 51 with the inner end portion of each of the springs closely surrounding the outer surface of the rotor cam element 52. The two springs 62 are identical so as to have substantially the same spring constant and each is compressed between the spoke portions 54 of the rotor and its spring retainer 63 carried by the rotor, the two spring retainers being located equal distances from the spoke portions, when the rotor is in its at rest position, so that each spring will have the same amount of initial compression.

As illustrated in FIG. 1, each of the spring retainers 63 includes an outer annular flange 64 which on one face flatly engages the outer flange 49 of the thrust plate 48, for sliding movement relative thereto, and on the other face engages the outer end of its associated spring 62. A cylindrical intermediate portion 65 extends axially inwardly from the annular flange 64, in surrounding relation to the outer end portion of the spring 62, and is bent radially outwardly at its inner end to form an inner annular flange 66. Each spring retainer 63 is mounted on the rotor by a plurality of shouldered studs 67 which are threaded into the spoke portions 54 so as to extend axially outwardly therefrom. The studs 67 slidably fit through openings in the retainer flanges 66 and are provided with enlarged heads 68 which, by engagement with the flanges 66, limit the outward movement of the spring retainer. Preferably, the length of the studs is such that when the rotor 51 is in its at rest position, as shown in FIG. 1, each spring retainer will simultaneously engage the heads 68 of its studs mounting it on the rotor and the outer annular flange 49 of the thrust plate 48 with little or no pressure being exerted between the thrust plate and the spring retainers.

To provide for the transmission of torque between the housing 10 and the rotor 51, the chamber 21 is partially filled with a viscous torque transmitting fluid 70. Referring to FIG. 1, which shows the fluid to be settled in the lower part of the chamber, as it will when the coupling is held stationary for some time, it will be observed that the fluid communicates freely with the two gaps 60 which are formed between the cylindrical surfaces 28 and 59. It will also be apparent that when the housing is rotated the fluid will be thrown, by centrifugal force, against the entire inner surface of the annular wall portion 14 of the housing. The quantity of fluid 70 introduced in the chamber 21, therefore, should be such that the centrifugally displaced fluid will form a layer having a depth or thickness that exceeds the radial thickness of the ribs 26, thereby submerging the gaps 60 in the fluid and providing a thin layer or film 71 of fluid in the gaps around the full circumferential length thereof. The fluid 70 may be any viscous fluid capable of transmitting torque between the rotor 51 and the housing 10 by means of viscous shear or drag forces developed in the film 71 as the result of slip between the rotor and the housing. Due, however, to the fact that the coupling may at times generate a substantial amount of heat, the fluid should preferably be one exhibiting a relatively small change of viscosity with temperature, such as the widely used silicone fluids.

The operation of the coupling may now be described as follows; with the housing 10 functioning as the driving member, the hub portion 22 is attached to a motor, or other power supply, shaft, not shown, and the outer portion 43 of the driven shaft 38 is connected by any suitable means to the power input shaft of the mechanical device, not shown, which is to be driven. Assuming further that both the motor and the driven mechanical device are stopped, the fluid 70 will have drained into the lower portion of the chamber 21, as shown in FIG. 1, and only the lower portions of the gaps 60 will be supplied with the viscous fluid.

When the motor is started, however, the housing will rotate and the fluid 70 will be thrown quickly, by centrifugal force, to the peripheral portion of the chamber 21 producing an annular layer of fluid which will submerge the gaps 60 and fill the same with the fluid around their entire circumferences. Further, the centrifugal force imparted to the fluid will pressurize the same so that the film will be maintained in the gaps 60, by the pressure of the fluid layer, against any tendency of the film to be thrown from the gaps by movement of the coupling parts.

Because of the inertia of the load, as represented by the driven mechanical device, the rotor 51 does not immediately approach the speed of the housing and instead slip occurs between the rotor and the housing causing the cylindrical surfaces 28 of the housing to be rotated relative to the cylindrical surfaces 59 of the rotor. This relative movement in turn effects a shearing action on the fluid film 71 in the gaps 60 resulting in the production of viscous shear or drag forces which act on the rotor in such a manner as to transmit torque from the housing to the rotor. The exact amount of torque transmitted depends on the percentage of slip between the rotor and the housing, on the effective surface area of the film 71, on the radial thickness of the film, and on the viscosity of the fluid 70.

For any one coupling the thickness of the gaps 60, and the viscosity are fixed, provided a fluid having a relatively constant viscosity-temperature relationship is used. The transmitted torque therefore becomes a function of only the slippage and the effective surface area of the film and, as brought out in more detail below, the coupling will act to automatically vary the effective surface area of the film and limit the amount of torque transmitted. It will be understood that, ignoring possible edge effects, the effective surface area of the film is the product of the means circumferential length of the cylindrical surfaces 28 and 59 and the width of the axial overlap between the cylindrical surfaces. As the width of the axial overlap changes the effective surface area of the film is accordingly changed to make more or less film available for the production of shear forces and the transmission of torque.

The torque transmitted to the rotor 51 through the viscous fluid shear connection provided by the film 71 is transmitted to the cam element 39 through the mechanical driving connection which includes the meshing helical cam teeth 40 and 55. The torque imposed on the cam element 39 is in turn transmitted to the driven mechanical device and will act to gradually accelerate the latter to its operating speed. As such speed is attained, the torque required is lessened and the amount of slip between the rotor and the housing will decrease to a value sufficient to develop a normal operating torque. The slip developed under normal operating speed and normal load conditions depends on the dimensions of various parts of the coupling, such as the rotor diameter, the pitch diameter of the helical teeth 40 and 55, the thickness of the gaps 60, and the axial widths of the cylindrical surfaces 28 and 59. These design factors may, of course, be varied to provide any desired normal operating slip; however, they are preferably so selected as to provide a minimal operating slip of between 0.1% and 1.0% which gives the coupling a high mechanical efficiency and reduces the generation of heat.

At this point, it should be noted that the mechanical connection between the rotor 51 and the cam element 39, afforded by the two series of helical cam teeth 40 and 55, produces an effect on the rotor tending to move the latter in one direction axially of the cam element, depending on the direction of rotation of the rotor. That is, the cam teeth 55 of the rotor engage the cam teeth 40 of the element 39 along pressure lines which, due to the helical shape of the teeth, are inclined with respect to the longitudinal axis of the element 39. Thus, as the teeth of the rotor bear against the teeth of the cam element and transmit torque thereto there is also developed a resultant force tending to move the rotor axially of the cam element.

As mentioned previously, however, axial movement of the rotor 51 relative to the cam element 39 is resisted by the springs 62, one or the other of which will always function to apply an axially directed force to the rotor in opposition to the resultant force produced by the action of the helical cam teeth 40 and 55. Although the springs 62 function to directly resist axial movement of the rotor 51, it is apparent that they also function to resist relative angular movement between the rotor and the cam element since such movements are dependent on each other and occur simultaneously.

Also, referring to FIG. 1, it will be noted that the studs 67 will prevent the spring retainers 63 from moving away from the rotor when a force is applied to the rotor tending to move the latter axially of the cam element 39. For that reason, only one of the springs 62 will function at any one time to produce an axial force against the rotor, while the other spring will move with the rotor and will exert no axial force against the rotor other than that which is due to the initial compression of the spring.

As long as the torque transmitted between the rotor 51 and the cam element 39 does not produce a resultant force sufficient to overcome the precompression of the affected spring 62 no relative movement will occur between the rotor and the cam element; the effective surface area of the film 71 will remain unchanged, and the amount of torque transmitted will, assuming a constant fluid viscosity, depend entirely on the percentage of slip between the rotor and the housing. Should the amount of transmitted torque, however, exceed the critical value at which the precompression of one of the springs is overcome, the rotor will move both axially and angularly of the cam element causing the cylindrical surfaces 59 to be moved axially relative to the cylindrical surfaces 28 thereby decreasing the effective surface area of the film 71 in the gaps 60. This decrease in the area of fluid film available for the production of shear forces decreases the amount of torque the coupling is capable of transmitting for a given amount of slip and therefore the slippage between the rotor and the housing will increase to compensate for the change in film area.

From this, it can be seen that the coupling will function to limit the amount of torque transmitted thereby. After the torque load reaches the critical value at which the rotor starts to move axially of the cam element, any further increase in the load will cause additional axial movement of the rotor, further decrease the effective film area, and produce increased slippage. Under these conditions the coupling will transmit a torque somewhat higher than the critical value; however, upon still further increase in load and still further axial movement of the rotor, the coupling will eventually reach a point of minimum overlap between the cylindrical surfaces 28 and 59 at which time the surface area of the film 71 will be so small as to be incapable of transmitting a further increase in torque. Hence, when the rotor attains such a position of minimum overlap the coupling will deliver a maximum torque to the driven machine which will not be exceeded despite higher demands from the machine.

The maximum torque that a coupling, made in accordance with this invention, is capable of transmitting depends, among other things, on the spring constants and the precompression of the springs 62. Therefore, it will be evident that the maximum torque-handling capacity of a coupling may be readily varied by the use of springs having different characteristics. Such interchange of springs is facilitated by the end cap 12 which is readily removed from the coupling to take the rotor and hub assembly from the housing.

One advantage of the torque-limiting characteristics of the above described coupling is that the maximum transmitted torque can be selected to be lower than the maximum torque of the drive motor, thereby guarding the motor against the heavy current drawn when delivering its maximum torque. For example, the maximum torque of a three-phase induction motor is generally somewhere between two and one-quarter to three times its operating torque. Therefore, if the maximum torque of the coupling is set at twice the operating torque of the motor the maximum torque of the motor will never be reached and the motor will always operate within a desirable torque range. Furthermore, under these conditions the motor will, when started, rapidly build up to operating speed with consequent low starting current due to the slippage which occurs between the rotor and the housing. It is apparent that the driving member may be rotated in either direction and that for either direction the coupling will function equally well to transmit and limit torque. For each direction of rotation a different one of the springs 62 will be affected and brought into action while the other spring will remain inactive and exert no net force on the rotor.

When used to drive a given mechanical device, the coupling is usually preferably designed so that the normal operating torque required by the driven device falls somewhere between the critical torque, at which the rotor starts to move axially of the cam element, and the maximum torque of the coupling. That is, under normal operation the rotor is preferably in a "floating" position somewhere between its at rest position of maximum cylindrical surface overlap and its maximum torque position of minimal overlap. Operation of the coupling with the rotor in a floating position is advantageous in that the ability of the rotor to shift axially in either direction allows the coupling to automatically compensate for any changes in fluid viscosity due to fluid temperature fluctuations so as to maintain the output speed relatively constant over a wide range of fluid temperatures.

Assuming, for example, that while operating the coupling the torque transmitting fluid is heated so as to lower its viscosity, the rotor will then shift axially to a position of greater overlap between the cylindrical surfaces and thereby augment the film area available for the production of shear forces to compensate for the lowering of the viscosity. Likewise, if the fluid viscosity is raised by the fluid being cooled, the rotor will shift to a position of lesser overlap and decrease the film area. Some changes in slip usually do occur as the rotor shifts to compensate for the changes in viscosity. However, with a minimal operating slip of between 0.1% and 1.0%, the changes in slip involved are of such small percentages as to have little effect on the output speed, which therefore remains relatively constant.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, I claim:

1. A power transmission coupling comprising a rotatable driving member, a rotatable driven member mounted in fixed axial relationship with said driving member, a rotatable intermediate member, means forming a viscous fluid shear connection for transmitting driving force from said driving to said intermediate member, and means forming a mechanical driving connection between said intermediate and driven members permitting limited relative axial and angular movements between said intermediate and driven members in response to variations in the resistance to rotation of the latter, means for limiting the relative movement between said intermediate and driven members to maintain said driving and intermediate members in an axial relationship in which said fluid shear connection therebetween will transmit driving forces at all times, increases in said resistance to rotation effecting relative movement between the driving and intermediate members in a direction to limit the driving forces that can be transmitted by said fluid shear connection to a selected maximum value.

2. A power transmission coupling comprising a rotatable driving member, a rotatable driven member mounted for rotation about the same axis as said driving member and in fixed axial relationship with the latter, a rotatable intermediate member, means forming a viscous fluid shear connection for transmitting driving forces from said driving to said intermediate member, and means forming a mechanical driving connection between said intermediate and driven members permitting limited relative axial and angular movements between said intermediate and driven members, said mechanical connection including cooperating cam elements on said last mentioned members responsive to variation in the resistance to rotation of said driven member for converting angular movement of said intermediate member relative to said driven member into axial movement of said intermediate member relative to said driven and driving members, and means for limiting the relative axial movement of said intermediate member to limit the driving force that can be transmitted by said fluid shear connection to a selected maximum value and to maintain at all times a relationship between the driving and intermediate members in which the fluid shear connection will transmit driving forces.

3. A power transmission coupling comprising a first coupling member, a second coupling member, said members being supported for rotation about a common axis, an intermediate member supported by said first member, means associated with said second and intermediate members forming a viscous fluid shear connection for transmitting driving forces between said second and intermediate members that vary in response to relative movement therebetween, means yieldably holding said intermediate member in a given axial position with respect to said first and second members and limiting axial movement of said intermediate member relative to said first and second members to a preselected range in which said fluid shear connection means will at all times transmit a driving force between said second and intermediate members, and drive means for transmitting torque between said intermediate member and said first member and, in response to an increase the torque transmitted thereby, for exerting an axially directed resultant force on said intermediate member to move the same axially against the force of said yieldable means and out of said given position toward a position at which said fluid shear connection can transmit a given maximum driving force.

4. A power transmission coupling as defined in claim 3 further characterized by said drive means comprising engaging cam surfaces on said intermediate and first members with said cam surfaces being arranged to effect axial movement of said intermediate member relative to said first member.

5. A power transmission coupling as defined in claim 3 further characterized by said drive means comprising meshing helical cam teeth on said first and intermediate members.

6. A power transmission coupling as defined in claim 3 further characterized by said yieldable means comprising a spring located on each of the axially opposite sides of said intermediate member.

7. A power transmission coupling comprising a rotatable housing forming a fluid tight chamber for holding a quantity of viscous torque transmitting fluid, means defining a viscous fluid shear driving surface on one wall of said chamber, a driven member located in said chamber and journaled in and coaxially with said housing, an intermediate member carried by said driven member having a viscous fluid shear driven surface disposed in closely spaced cooperating relation to said driving surface with the space between said surfaces being in communication with the viscous fluid holding housing chamber, means supporting said intermediate member on said driven member for limited axial movement relative to the driving member to vary within a predetermined operating range the relationship between said cooperating driving and driven surfaces and the torque transmitting effect of the viscous fluid therebetween, and means for transmitting torque between said intermediate and driven members and, when the torque transmitted therebetween reaches a predetermined value, for moving said intermediate member axially toward the limit of relative movement between said intermediate and driving members to maintain said driving and driven surfaces in torque transmitting relationship at all times and to limit the torque transmitting effect of the viscous fluid between said driving and driven surfaces to a selected maximum value.

8. A power transmission coupling as defined in claim 7 further characterized by the means for transmitting torque between the intermediate and driven members and for moving the intermediate member axially comprising a cam action mechanical driving connection between the intermediate and driven members.

9. A power transmission coupling as defined in claim 7 further characterized by the quantity of said fluid in the housing chamber being only sufficient to partially fill said chamber, and the said viscous fluid shear driving and driven surfaces being so positioned relative to the peripheral surface of the fluid tight housing chamber that rotation of the housing will throw the viscous fluid by centrifugal force into the space between said driving and driven surfaces to develop a viscous fluid shear film between said surfaces.

10. A power transmission coupling as defined in claim 9 further characterized by the means for transmitting torque between the intermediate and driven members and for moving the intermediate member axially comprising a yieldable mechanical driving connection between said intermediate and driven members operable to control the amount of torque transmitted between the driving and driven surfaces by said viscous fluid shear film.

11. A power transmission coupling as defined in claim 10 further characterized by the said yieldable mechanical driving connection comprising cooperating cam surfaces on said intermediate and driven members for moving said intermediate member axially of the driven member as the result of relative rotational movement between said members, and means for yieldably resisting movement of said intermediate member relative to said driven member.

12. A power transmission coupling as defined in claim 7 further characterized by the said viscous fluid shear driving and driven surfaces both being annular, being supported for rotation about an axis that is common to both surfaces and to the rotatable housing, and being so positioned relative to the peripheral surface of the fluid tight housing chamber that rotation of the housing will throw the said fluid by centrifugal force into the entire space that is between said driving and driven surfaces to develop a viscous fluid shear film between said surfaces.

13. A power transmission coupling as defined in claim 12 further characterized by the said viscous fluid shear driving and driven surfaces both being cylindrical and of sufficiently different diameters to permit the driven surface to be positioned within the driving surface.

14. A power transmission coupling, comprising a rotatable housing having an enclosed chamber therein, an inwardly facing cylindrical driving surface in said chamber fixed in relation to said housing, a driven member in said chamber and journaled in said housing for rotation relative to the latter about an axis common to that of said cylindrical driving surface, a rotor carried by said driven member having an outwardly facing cylindrical driven surface closely spaced in radial relation to said driving surface, a fluid in said chamber in communication with the space between said cylindrical surfaces to form a torque transmitting fluid film between said cylindrical surfaces when said housing is rotated, and a mechanical driving connection between said rotor and said driven member permitting limited relative axial and angular movement therebetween, including cooperating cam elements on said rotor and driven member for converting angular movement of said rotor relative to said driven member into axial movement therebetween and for moving said outwardly facing cylindrical surface axially relative to said inwardly facing cylindrical surface to limit the torque transmitting effect of the fluid film between said surfaces.

15. A power transmission coupling, comprising a rotatable housing having an enclosed chamber therein, an inwardly facing cylindrical driving surface of a given axial width in said chamber fixed in relation to said housing, a driven member in said chamber and journaled in said housing for rotation relative to the latter about an axis common to that of said cylindrical driving surface, a rotor carried by said driven member having an outwardly facing cylindrical driven surface of substantially the same axial width as and in closely spaced radial relation to said driving surface, means for yieldably holding said rotor in an at rest axial position relative to said driven member wherein said cylindrical driven surface is substantially fully overlapped by said cylindrical driving surface and for yieldably resisting axial movement of said rotor away from said at rest position, drive means for transmitting torque between said rotor and said driven member and, as a result of the torque transmitted thereby, for exerting a resultant force on said rotor tending to move the same axially against the force of said yieldable means to change the extent of overlap of said cylindrical surfaces, and a fluid in said chamber in communication with the space between the overlapped cylindrical surfaces for forming a torque transmitting fluid film between said overlapped surfaces when said housing is rotated.

16. A power transmission coupling as defined in claim 15 further characterized by the means for yieldably holding said rotor and resisting its axial movement comprising a normally compressed coil spring positioned between each side of said rotor and said driven member, and said drive means for transmitting torque between said rotor and driven member and for exerting a resultant force tending to move said rotor, comprising meshing helical cam teeth on said rotor and said driven member.

17. A power transmission coupling as defined in claim 15 further characterized by the cylindrical driving and driven surfaces each comprising a plurality of axially spaced, annular surface portions with the annular driving surfaces fully overlapping and radially aligned with the annular driven surfaces when the rotor is in its at rest position.

18. A power transmission coupling as defined in claim 17 further characterized by the means for yieldably holding said rotor and resisting its axial movement comprising a normally compressed coil spring positioned between each side of said rotor and said driven member, and said drive means for transmitting torque between said rotor and driven member and for exerting a resultant force tending to move said rotor, comprising meshing helical cam teeth on said rotor and said driven member.

References Cited in the file of this patent

UNITED STATES PATENTS

| | | |
|---|---|---|
| 1,238,447 | Severy | Aug. 28, 1917 |
| 2,079,724 | Van Ranst | May 11, 1937 |
| 2,094,095 | Collins | Sept. 28, 1937 |
| 2,313,132 | Elliott | Mar. 9, 1943 |
| 2,359,930 | Miller | Oct. 10, 1944 |
| 2,400,186 | Armentrout | May 14, 1946 |
| 2,714,946 | Tenot et al. | Aug. 9, 1955 |
| 2,863,542 | Kelsey | Dec. 9, 1958 |

FOREIGN PATENTS

| | | |
|---|---|---|
| 902,874 | France | Jan. 3, 1945 |